United States Patent [19]
Ogawa et al.

[11] 3,948,860
[45] Apr. 6, 1976

[54] PROCESS FOR THE PRODUCTION OF FLAME-RETARDANT POLYURETHANES

[75] Inventors: Yoshikatsu Ogawa, Takatsuki; Haruhiko Hisada, Yao; Takeshi Kasahara; Fumihiko Kizaki, both of Sakai, all of Japan

[73] Assignee: Marubishi Yuka Kogyo Kabushiki Kaisha, Japan

[22] Filed: Feb. 13, 1974

[21] Appl. No.: 442,003

[30] Foreign Application Priority Data
Feb. 20, 1973  Japan.............................. 48-19715

[52] U.S. Cl. 260/77.5 AR; 260/2.5 AR; 260/75 NR
[51] Int. Cl.² .................. C08G 18/50; C08G 18/15
[58] Field of Search.. 260/2.5 AR, 2.5 AJ, 77.5 AR, 260/75 NR

[56] References Cited
UNITED STATES PATENTS

| | | | |
|---|---|---|---|
| 3,093,599 | 6/1963 | Mueller-Tamm | 260/2.5 |
| 3,157,613 | 11/1964 | Anderson | 260/45.7 P |
| 3,291,867 | 12/1966 | Shew | 260/2.5 AR |
| 3,423,486 | 1/1969 | Rätz | 260/2.5 AR |
| 3,784,592 | 1/1974 | Leonard | 260/2.5 AJ |
| 3,830,886 | 8/1974 | Davis | 260/2.5 AJ |

*Primary Examiner*—C. Warren Ivy
*Attorney, Agent, or Firm*—Robert E. Burns; Emmanuel J. Lobato; Bruce L. Adams

[57] ABSTRACT

Highly durable flame-retardant polyurethanes can be produced by the process wherein 3 mols of dibromoneopentyl glycol is reacted with 0.5 to 4 mols of phosphoric anhydride, the ester thus obtained is reacted with at least one member selected from the group consisting of alkylene oxides and haloalkylene oxides and then, the phosphorus compound thus obtained, as a portion of a polyhydroxyl component, is incorporated with another polyhydroxyl compound and reacted with a polyisocyanate component in the presence of a catalyst.

7 Claims, No Drawings

PROCESS FOR THE PRODUCTION OF FLAME-RETARDANT POLYURETHANES

The present invention relates to a process for the production of flame-retardant polyurethanes.

In general, polyurethanes are produced by reacting polyisocyanate with a polyhydroxyl compound having two or more active hydrogen atoms and formed into rigid, semi-rigid or flexible spongy foams, polyurethane resin shaped articles, polyurethane resin paints, urethane rubbers, synthetic polyurethane fibers and the like. However, since polyurethanes are flammable and particularly, the polyurethane foams are inflammable, they are unsuitable for materials for building parts, air conditioners, motorcars and vehicular parts or for use where there is a danger of combustion.

Numerous methods have been developed for rendering polyurethane flame-retardant. Among the flame-retarding methods used up to now two widely used methods are one in which flame-retardance is imparted by physically mixing flame-retardant agents with polyurethane and then forming the mixture into various articles, and another in which flame-retardant agents are applied to polyurethane articles after they are formed. It is known that the flame-retardant agents usable for these methods include ammonium phosphate, antimony oxide, chlorinated paraffin, tris-($\beta$-chloroethyl) phosphate, tris-($\beta$,$\gamma$-dibromopropyl)phsophate and other phsphorus or halogeno compounds. In these methods, however, these agents are merely added or applied physically into polyurethane or onto the surface thereof and, therefore, the obtained products have the disadvantage that the flame-retardant effects are not uniform or that the flame-retardant agents fall off from the articles with lapse of time so as to reduce the flame-retardant effects. Also, these methods require the application of a large amount of the flame-retardant agents in order to make the durability flame retardance longer and, therefore, they have the disadvantages of lowering the excellent physical properties characteristic to polyurethanes.

Other methods have been used for rendering polyurethane flame-retardant, in which flame-retardant polyurethane is obtained, for example, by using a phosphorus or halogeno compound, e.g. polyol containing phosphorus and/or halogen atoms, and pentaerythritol and triphenyl phosphite as the polyhydroxyl component. However, polyurethanes obtained by these known methods have low durability, inferior physical properties and low retentivity of flame-retardance.

As discussed above, although many methods have been proposed for rendering polyurethane flame-retardant, particularly with respect to soft polyurethane foams, there are only a few of the methods suitable for practical use.

The principle object of the present invention is to provide a process for the production of flame-retardant polyurethanes which are excellent in flame-retardance and durability, without reducing the physical properties characteristic to polyurethanes.

The process according to the present invention is a process for the production of flame-retardant polyurethanes by reacting a polyisocyanate and a polyhydroxyl compound in the presence of a catalyst and, optionally, other additives, characterized in that 3 mols of dibromoneopentyl glycol is reacted with 0.5 to 4 mols, preferably 1 to 2 mols of phosphoric anhydride. The ester thus obtained is reacted with at least one member selected from the group consisting of alkylene oxides and haloalkylene oxides, and then, the phosphorus compound thus obtained, as a portion of the polyhydroxyl component, is incorporated with another polyhydroxyl compound and reacted with the polyisocyanate component. According to the process of the present invention, excellent flame-retardant polyurethanes can be obtained.

The physical properties of polyurethanes obtained by the process of the present invention are not substantially different from those of the usual polyurethanes. Particularly, polyurethanes according to the invention bear few or none of the drawbacks, i.e. crack, imperfect foaming or the like, which often occur in the usual foaming process. Furthermore, the polyurethane foams consisting of polyurethane according to the invention have a soft feel and are rich in elasticity. Their flame-retardant properties are homogeneous and very durable and also, no hygroscopic property is born therein. Owing to these excellent properties, polyurethanes according to the present invention can be suitably used as materials for bedding and buildings or for electrical appliances, motorcars and vehicular parts and other sundry goods.

In the process of the present invention, firstly, dibromoneopentyl glycol phosphoric acid ester is obtained by reacting 3 mols of dibromoneopentyl glycol with 0.5 to 4 mols, preferably 1 to 2 mols of phosphoric anhydride. If less than 0.5 mols of phosphoric anhydride is used, it is difficult to obtain polyurethanes having the desired flame-retardant property. If more than 4 mols of this compound is used, the flame-retardant effect is not increased and, therefore, there is a disadvantage from the economic point of view in the resulting polyurethanes. At least one member selected from the group consisting of alkylene oxides and haloalkylene oxides is added to the dibromoneopentyl glycol phosphoric acid ester obtained by the reaction.

The alkylene oxides usable for the process of this invention may comprise, for example, ethylene oxide and propylene oxide, and the haloalkylene oxides may comprise, for example, epichlorohydrin and epibromohydrin.

The compound usable for the polyhydroxyl component, incorporated with the above-mentioned phosphorus compound, according to this invention may comprise ethylene glycol, propylene glycol, butanediol, polyoxyethylene glycol, poly-oxypropylene glycol, polyoxypropylene-ethylene copolymer and the like. The compound usable for the polyisocyanate component according to the invention may comprise 2,4- and 2,6-tolylene diisocyanate, hexamethylene diisocyanate, tetra-methylene diisocyanate, diphenylmethane diisocyanate, chloro-phenylene diisocyanate, xylene diisocyanate, naphthalene 1,5-diisocyanate and the like.

The amount of phosphorus compound reacted, as a portion of the polyhydroxyl component, with the polyisocyanate component in the polyurethane forming process is to be from 1 to 25% based on the total weight of the reactants used in this polyisocyanate forming process. If the phosphorus compound is in an amount of less than 1%, the flame-retardant property of the resulting polyurethane is inadequate. Alternatively, even if more than 25% of the compound is used, the flame-retardant effect is not increased and, moreover, the physical properties, especially, the permanent strain scorching and the surface hardness of the resulting polyurethane are reduced.

The features of the process of this invention will be more distinctly illuminated by the following illustrative, but not limitative examples, wherein all parts are by weight.

EXAMPLE 1

142 parts of phosphoric anhydride and 786 parts of dibromoneopentyl glycol (mol ratio 1 : 3) were reacted at 100° to 140° C for 120 minutes. 279 parts of epichlorohydrin was reacted with 928 parts of the obtained phosphoric ester at 100° to 120° C for 60 minutes and then 300 parts of propylene oxide was added to the reaction product at 60° to 100° C for 120 minutes. Unreacted propylene oxide was removed by heating to 90° C under reduced pressure (2 mmHg). Thus, 1439 parts of a viscous liquid was obtained. In this phosphorus compound, phosphorus content was 4.3%, halogen content was 40.6% and hydroxyl value was 140.

10 parts of the phosphorus compound obtained was mixed uniformly with 90 parts of a commercially available propylene oxide adduct of glycerine having an average molecular weight of 3000 (polyol for soft polyurethane sold by Sanyo Kasei Co. under the tradename "Sannix G-P 3000"). The mixture was vigorously agitated with a mixture of 0.10 parts of triethylene diamine, 0.17 parts of stannous octoate, 1.2 parts of a commercially available silicone foam stabilizer Silicone SH 190 (Toray Silicone) and 4.0 parts of water and with a mixture of 50.3 parts of tolylene diisocyanate and 5 parts of trichlorofluoromethane to obtain a bubble formation. Then, this was hardened at 140° C.

The SH 190 material is a silicone-glycol cell control additive which is stable in water and mixtures of foam ingredients and has the following typical properties:

| | |
|---|---|
| Viscosity (at 25°C, centistokes) | 1000–1500 |
| Specific Gravity (at 25°C) | 1.035–1.040 |
| Refractive Index (at 25°C) | 1.4500 |
| Color (Gardner Scale) | 1 to 4 |
| Hydroxyl Content (%, Infrared Method) | nil |
| Solubility (Water) | completely soluble |
| Water Stability | stable |
| Pour Point (°C) | −4.4 |

The polyurethane foam thus obtained burned weakly in contact with a flame but the fire went out spontaneously immediately after being removed from the flame. Even after the foam was heated at 70° C for two weeks in a Geer's oven, it was still self-extinguishable. The foam was also self-extinguishable below or within Class A according to the test method defined in U.S. Motor Vehicle Safety Standard 302.

The foam had the following properties.

| | |
|---|---|
| Physical properties | |
| Density: | 0.020 (g/cm³) |
| Tensile strength: | 1.31 (kg/cm²) |
| Compression strain (50%): | 6.0 (%) |
| Tear strength: | 0.99 (kg/cm) |
| Flame-retardance (according to ASTMD-1692-59-T) | |
| After hardening | |
| Burning extent: | 0.5 (cm) |
| Extinguishment time: | 0.6 (second) |
| After treatment (70°C, 2 weeks) | |
| Burning extent: | 0.6 (cm) |
| Extinguishment time: | 0.7 (second) |

For comparison, the following shows the properties of the polyurethane foam obtained by the procedure as described above, except that the phosphorus compound according to the invention was not used.

| | |
|---|---|
| Density: | 0.020 (g/cm³) |
| Tensile strength: | 1.20 (kg/cm²) |
| Compression strain (50%): | 6.0 (%) |
| Tear strength: | 0.96 (kg/cm) |
| Flame-retardance: burned out, not self-extinguishable | |

EXAMPLE 2

284 parts of phosphoric anhydride and 786 parts of dibromoneopentyl glycol (mol ratio 2 : 3) were reacted at 100 to 140° C for 120 minutes. 372 parts of epichlorohydrin was reacted with 1070 parts of the obtained phosphoric ester and then 500 parts of propylene oxide was added to the reaction product. Unreacted propylene was removed by heating under reduced pressure and thus, 1848 parts of a viscous liquid was obtained. In this phosphorus compound, phosphorus content was 6.7%, halogen content was 33.5% and hydroxyl value was 170.

5 parts of the phosphorus compound obtained was mixed uniformly with 95 parts of commercially available propylene oxide adduct of glycerine (as in Example 1). The mixture was vigorously agitated with a mixture of 0.10 parts of triethylenediamine, 0.15 parts of stannous octoate, 1.2 parts of a commercially available silicone foam stabilizer (as in Example 1) and 4.0 parts of water and with a mixture of 50.3 parts of tolylene diisocyanate and 5 parts of trichloro-fluoromethane to obtain a bubble formation. Then, this was hardened at 140° C.

The polyurethane foam thus obtained burned weakly in contact with a flame but the fire went out spontaneously immediately after being removed from the flame. Even after the foam was heated at 70° C for two weeks in a Geer's oven, it was still self-extinguishable. The foam was also self-extinguishable below or within Class A according to the test method defined in U.S. Motor Vehicle Safety Standard 302.

The foam had the following properties.

| | |
|---|---|
| Physical properties | |
| Density: | 0.021 (g/cm³) |
| Tensile strength: | 1.28 (kg/cm²) |
| Compression strain (50%): | 5.8 (%) |
| Tear strength: | 1.05 (kg/cm) |
| Flame-retardance (according to ASTMD-1692-59-T) | |
| After hardening | |
| Burning extent: | 0.6 (cm) |
| Extinguishment time: | 0.6 (second) |
| After treatment (70°C 2 weeks) | |
| Burning extent: | 0.7 (cm) |
| Extinguishment time: | 0.8 (second) |

For comparison, a polyurethane foam was produced by the procedure as described above, using tris-$\beta$-chloroethyl phosphate as flame-retardant agent. The reagents used and composition was as follows.

| | |
|---|---|
| Propylene oxide adduct of glycerine (as in Example 2): | 100 parts |
| tris-$\beta$-chloroethyl phosphate: | 7.5 parts |
| Triethylenediamine: | 0.10 parts |
| Stannous octoate: | 0.15 parts |
| Silicone foam stabilizer (as in Example 1): | 1.2 parts |
| Water: | 4.0 parts |
| Trichlorofluoromethane: | 5.0 parts |

-continued

Tolylene diisocyanate:     49.6 parts

The properties of the obtained polyurethane foam were as follows.

| | |
|---|---|
| Density: | 0.024 (g/cm³) |
| Tensile strength: | 0.72 (kg/cm²) |
| Compression strain (50%): | 1.2 (%) |
| Tear strength: | 0.51 (kg/cm) |
| Flame-retardance: self-extinguishable | |

EXAMPLE 3

426 parts of phosphoric anhydride and 786 parts of dibromoneopentyl glycol (mol ratio 3 : 3) were reacted at 100 to 140° C for 120 minutes and then 54 parts of water was added to the reaction mixture to produce phosphoric ester. 1116 parts of epichlorohydrin was reacted with 1266 parts of the ester and 800 parts of propylene oxide was added to the reaction produce. Then, unreacted propylene oxide was removed by heating to 90° C under reduced pressure (2 mmHg). Thus, 3078 parts of a viscous liquid was obtained. In this phosphorus compound, phosphorus content was 6.1%, halogen content was 29.2% and hydroxyl value was 100.

4 parts of the phosphorus compound obtained was mixed 96 parts of commercially available polyol a mixture of 48 parts of a commercially available propylene oxide adduct of glycerine (as in Example 2) and 48 parts of a commercially available propylene oxide adduct of glycerine partially containing ethylene oxide units and having an average molecular weight of 3000 (polyol for polyurethane mold foaming sold by Sanyo Kasei Co. under the tradename "Sannix G-L 3000"). Then, the mixture was vigorously agitated with a mixture of 0.10 parts of triethylene-diamine 0.13 parts of stannous octoate, 1.2 parts of silicone foam stabilizer (as in Example 1) and 4.0 parts of water and with a mixture of 50.1 parts of tolylene diisocyanate and 10 parts of trichlorofluoromethane to obtain a babble formation. Then, this was hardened at 150° C for 15 minutes.

The polyurethane foam thus obtained burned weakly in contact with a flame but the fire went out spontaneously immediately after being removed from the flame. Even after the foam was heated at 70° C for two weeks in a Geer's oven, it was still self-extinguishable. The foam was also self-extinguishable below or within Class A according to the test method defined in U.S. Motor Vehicle Safety Standard 302.

The foam had the following properties.

| | |
|---|---|
| Physical properties | |
| Density: | 0.025 (g/cm³) |
| Tensile strength: | 2.0 (kg/cm²) |
| Compression strain (50%): | 6.0 (%) |
| Tear strength: | 1.05 (kg/cm) |
| Flame-retardance (according to ASTMD-1692-59-T) | |
| After hardening | |
| Burning extent: | 0.7 (cm) |
| Extinguishment time: | 0.6 (second) |
| After treatment (70°C, 2 weeks) | |
| Burning extent: | 0.7 (cm) |
| Extinguishment time: | 0.7 (second) |

EXAMPLE 4

10 parts of the phosphorus compound obtained as in Example 2 was mixed uniformly with 90 parts of a commercially available propylene oxide adduct of sorbitol having an average molecular weight of 750 (polyol for rigid polyurethane sold by Sanyo Kasei Co. under the tradename of "Sannix S-P 750°") and then 1.0 parts of diethylethanolamine, 0.5 parts of dibutyltin dilaurate and 1.5 parts of silicone foam stabilizer (as in Example 1) were added. The mixture was vigorously agitated with a mixture of 120 parts of tolylene diisocyanate and 30 parts of trichlorofluoromethane to obtain a bubble formation. Then, this was hardened at 140° C.

The rigid polyurethane foam thus obtained burned weakly in contact with a flame but the fire went out spontaneously immediately after being removed from the flame. Even after the foam was heated at 70° C for two weeks in a Geer's oven, it was still self-extinguishable.

The foam had the following properties.

| | |
|---|---|
| Physical properties | |
| Density: | 0.035 (g/cm³) |
| Compression strength: | 2.5 (kg/cm²) |
| Flame-retardance (according to ASTMD-1692-59-T) | |
| After hardening | |
| Burning extent: | 1.0 (cm) |
| Extinguishment time: | 1.2 (second) |
| After treatment (70°C, 2 weeks) | |
| Burning extent: | 1.2 (cm) |
| Extinguishment time: | 1.2 (second) |

What we claim is:

1. A process for the production of flame-retardant polyurethanes by reacting a polyisocyanate and a polyhydroxyl compound in the presence of a catalyst and, optionally, other additives, characterized in that 3 mols of dibromoeopentyl glycol is reacted with 0.5 to 4 mols of phosphoric anhydride, the ester thus obtained is reacted with at least one member selected from the group consisting of alkylene oxides and haloalkylene oxides and then, the phosphorus compound thus obtained and having a hydroxyl value of not more than 170, as a portion of the polyhydroxyl component, is incorporated with another polyhydroxyl compound and reacted with the polyisocyanate component.

2. A process as claimed in claim 1, further characterized in that the phosphorus compound is reacted in an amount of from 1 to 25% based on the total weight of the reactants to be used in the polyurethane forming process.

3. A process as claimed in claim 1, further characterized in that phosphoric anhydride is used in an amount of 1 to 2 mols.

4. A process as claimed in claim 1, further characterized in that the alkylene oxide is selected from the group consisting of ethylene oxide and propylene oxide.

5. A process as claimed in claim 1, further characterized in that the haloalkylene oxide is selected from the group consisting of epichlorohydrin and epibromohydrin.

6. A process as claimed in claim 1, further characterized in that the polyisocyanate is selected from the group consisting of 2,4- and 2,6-tolylene diisocyanate, hexamethylene diisocyanate, tetramethylene diisocyanate, diphenylmethane diisocyanate, chlorophenylene diisocyanate, xylene diisocyanate and naphthalene 1,5-diisocyanate.

7. A process as claimed in claim 1, further characterized in that the polyhydroxyl compound is selected from the group consisting of ethylene glycol, propylene glycol, butanediol, polyoxyethylene glycol, polyoxypropylene glycol and polyoxypropylene-ethylene copolymer.

* * * * *